(12) United States Patent
Ismael

(10) Patent No.: US 8,014,664 B2
(45) Date of Patent: Sep. 6, 2011

(54) FILTER MOVING SOLENOID SYSTEM FOR A CAMERA

(75) Inventor: George Ismael, Rosamond, CA (US)

(73) Assignee: Non Typical, Inc., Green Bay, WI (US)

( * ) Notice: Subject to any disclaimer, the term of this patent is extended or adjusted under 35 U.S.C. 154(b) by 0 days.

(21) Appl. No.: 12/604,231

(22) Filed: Oct. 22, 2009

(65) Prior Publication Data

US 2010/0098401 A1   Apr. 22, 2010

Related U.S. Application Data

(60) Provisional application No. 61/107,611, filed on Oct. 22, 2008.

(51) Int. Cl.
G03B 7/00 (2006.01)

(52) U.S. Cl. .................................. 396/241; 396/427

(58) Field of Classification Search ............... 396/241, 396/468, 427; 335/219, 220, 229, 232, 251
See application file for complete search history.

(56) References Cited

U.S. PATENT DOCUMENTS

| 5,446,514 A * | 8/1995 | Matsumoto .................. 396/463 |
| 7,708,479 B2 * | 5/2010 | Watanabe et al. ............. 396/488 |
| 2007/0201866 A1 * | 8/2007 | Kihara .......................... 396/468 |
| 2008/0175584 A1 * | 7/2008 | Ohkuma ....................... 396/458 |

* cited by examiner

*Primary Examiner* — Clayton E Laballe
*Assistant Examiner* — Dennis Hancock
(74) *Attorney, Agent, or Firm* — Jansson Shupe & Munger Ltd

(57) ABSTRACT

A filter-moving solenoid system for use with a camera is provided. The filter-moving solenoid system includes a solenoid and an armature that has at least first and second operative positions and at least first and second contact segments. A first contact segment is held against or adjacent the solenoid when the armature is in a first operative position and a second contact segment is held against or adjacent the solenoid when the armature is in a second operative position. The filter-moving solenoid system is configured so that the armature is self-stable in each of the first and second positions, allowing the filter to selectively remain fixed in such positions without requiring the solenoid to be energized in so doing.

16 Claims, 5 Drawing Sheets

FILTER MOVING SOLENOID SYSTEM FOR A CAMERA

CROSS-REFERENCE TO RELATED APPLICATIONS

This application claims priority under 35 U.S.C. §119(e) from U.S. Provisional Patent Application Ser. No. 61/107,611, filed on Oct. 22, 2008, the entirety of which is expressly incorporated by reference herein.

BACKGROUND OF THE INVENTION

1. Field of the Invention

The invention relates to cameras and, more particularly, to improved ways of moving various optical filters in front of or away from a lens in a camera that is configured for both daytime and nighttime usage.

2. Discussion of the Related Art

Game animal observation for recreation and/or for scouting in association with hunting activities is growing increasingly popular. Game animal observation or scouting activities can include implementation of scouting cameras for taking photographs, video footage, or other video recordings. Use of scouting cameras for game animal observation or scouting is generally known.

At times, it can be desirable to use scouting cameras for memorializing both (i) daytime or diurnal activities, and (ii) nighttime or nocturnal activities of game animals. To accomplish this, some game animal observers or hunters us multiple cameras at a single scouting location, e.g., a conventional scouting camera for daytime use and a camera with an infrared flash for nighttime use. Purchasing, using, and maintaining multiple cameras for scouting a single game animal at a single location can be relatively expensive and burdensome.

Other approaches to scouting game animals during both daytime and nighttime periods include using a single camera that is configured for both daytime and nighttime functionality. These include film and other cameras that are sensitive to infrared illumination and have infrared filters that can be positioned in front of their lenses. In this configuration, an infrared filter is positioned in front of and prevents infrared illumination from entering a lens during daytime use. During nighttime use, the filter is moved away from the lens, allowing the infrared illumination to pass therethrough and facilitate creation of infrared images. In this regard, known scouting cameras accommodate both daytime and nighttime usage.

Notwithstanding, known scouting cameras capable of both daytime and nighttime usage have at least some drawbacks. Exemplary of such drawbacks is that known cameras use a mechanism that is energized and held in its energized state to maintain either a filtering or non-filtering position of the infrared filter. Some known cameras energize a mechanism to move an infrared filter over a lens, in a filtering position. The infrared filter is maintained in this filtering position by keeping the mechanism energized. In other words, in such scouting cameras, the mechanism is always energized when the infrared filter is positioned over the lens. In other known scouting cameras, the filter is maintained not in its filtering position but rather in a non-filtering position by maintaining a mechanism in an energized state.

It is also known in some prior art cameras to incorporate a spring or spring-like device to mechanically hold a filter in a default position, whether the default position is a filtering or non-filtering position. Such springs can have a limited use life and can fatigue or fail over time, requiring time intensive and costly repair.

Regardless of whether the default position of the infrared filter is a filtering or non-filtering position, during use in the other, e.g., non-default filter position, the mechanism of known scouting cameras is continuously energized while maintaining at least one of the positions. Furthermore, the mechanism is energized to move the infrared filter back and forth between such filtering and non-filtering positions. Moving the infrared filter takes time and therefore causes slow response times, significantly comprising performance when trying to capture targets in motion. Additionally, moving and maintaining infrared filter positions can create a significant power demand and correspondingly use a significant amount of energy over time. This can be problematic because scouting cameras tend to be mounted in remote locations for relatively long periods of time making, for example, battery replacement or recharging inconvenient. An improvement on these drawbacks was desired.

SUMMARY OF THE INVENTION

In light of the foregoing, a filter-moving solenoid system for use with cameras is provided that improves known systems by overcoming the aforesaid problems. Compared to known scouting cameras, the filter-moving solenoid system of the invention relatively reduces the amount of time that energy must be supplied to the system, facilitating the ability to use the system for extended periods of time and offers relatively quicker filter-moving response times.

According to one aspect of the invention, a filter-moving solenoid system for use with a camera is provided that includes a solenoid and an armature, movable between at least first and second operative positions and having at least first and second contact segments. The first contact segment is held against or adjacent the solenoid when the armature is in the first operative position. The second contact segment is held against or adjacent the solenoid when the armature is in the second operative position. The filter-moving solenoid system is configured so that the armature is self-stable in each of the first and second positions. This allows the filter to selectively remain fixed in such positions without requiring the solenoid to be energized in so doing. In other words, during complete use cycles in which the filter moves back and forth between filtering and non-filtering positions, the solenoid is energized only during armature movement, not while the filter is still, in a static position, or motionless.

According to another aspect, at least one of the first and second contact segments of the armature can include a permanent magnet. The permanent magnet can attract to a ferromagnetic core of the solenoid, holding the armature in a fixed position in a self-stable manner.

In yet another embodiment, the armature has a forked configuration so that the first and second contact segments are positioned on opposing sides of or straddle the solenoid. The first and second contact segments can be movable along an arcuate travel path, carrying a filter that is mounted to the armature and is movable along a similar arcuate path. The solenoid is positioned between the first and second contact segments so that its first and second ends lie directly in such arcuate travel path. In this configuration, as the first and second contact segments traverse the arcuate travel path, they become aligned with respective ones of the first and second solenoid ends.

According to some aspects of the invention, a first self-stable position of the armature is defined when the first contact segment directly contacts or otherwise aligns with the first end of the solenoid. A second self-stable position of the armature can be defined when the second contact segment directly contacts or otherwise aligns with the second end of the solenoid. In this preferred embodiment, the first and second self-stable positions of the armature are maintained without electromagnetic influence from an energized solenoid.

In some embodiments, the forked armature includes first and second prongs that are connected to each other, each of the first and second prongs having a permanent magnet mounted thereto. The permanent magnets can be recessed into or within outwardly facing surfaces of the first and second prongs.

In yet other aspects, the forked armature pivots about an axis that is transversely displaced from a medial portion of the solenoid.

In some embodiments, (i) a time period in which the solenoid is energized for moving the armature to the first position defines a first energized duration, and (ii) a time period in which the armature remains in the first position defines a first de-energized duration, the first de-energized duration being longer than the first energized duration. In this same embodiment, (i) a time period in which the solenoid is energized for moving the armature to the second position can define a second energized duration, and (ii) a time period in which the armature remains in the second position can define a second de-energized duration, the second de-energized duration being longer than the second energized duration. This allows the solenoid to be used to provide a driving force for moving the armature, while not requiring the solenoid to be energized for maintaining the armature in a non-moving position, correspondingly providing a relatively low energy usage device.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

Figure 1:
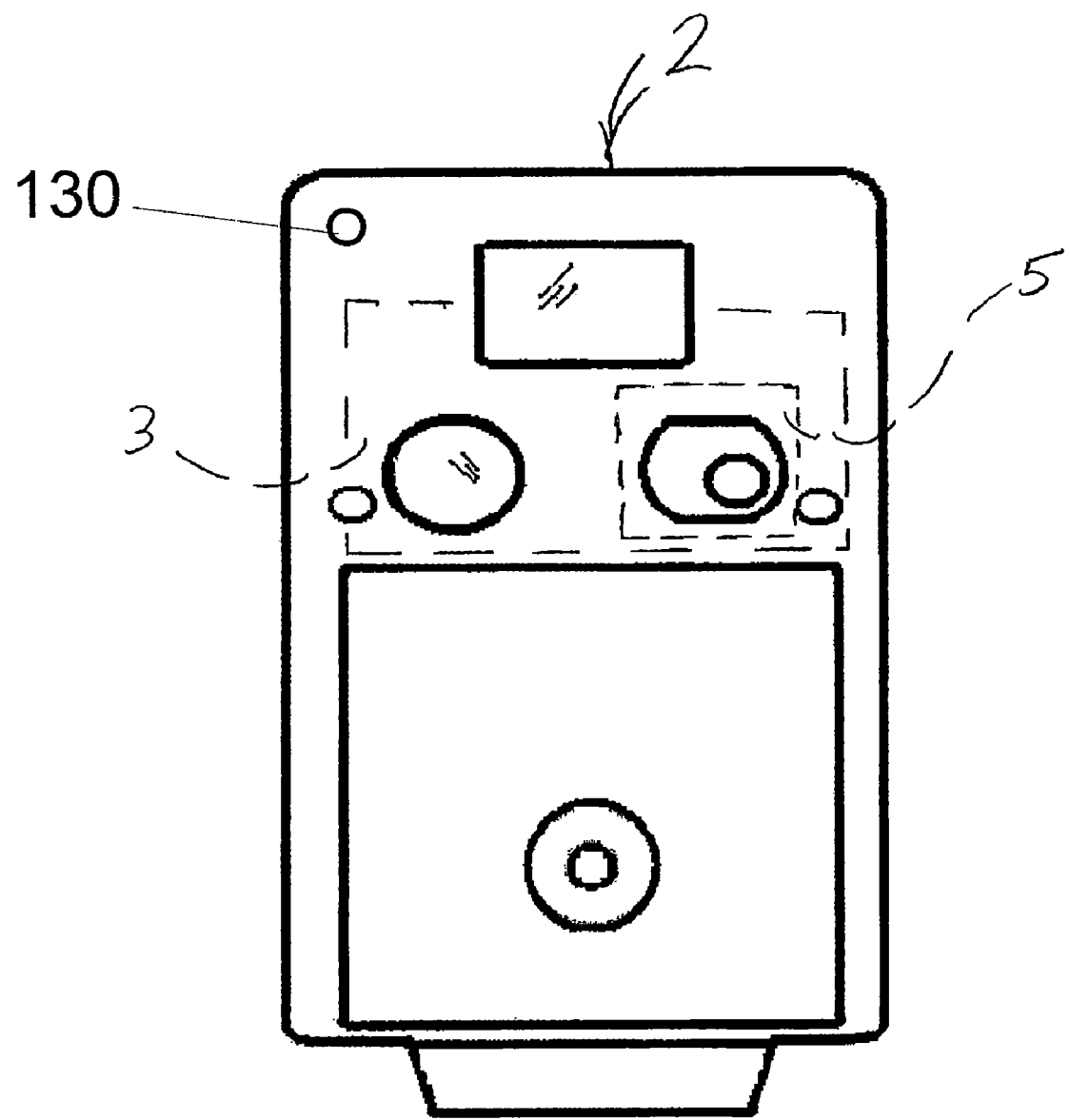
FIG. 1 is front elevation view of a scouting camera incorporating a first embodiment of a filter-moving solenoid system of the invention.

With initial reference to FIG. 1, a filter-moving solenoid system for use with a camera, e.g., solenoid system 5, is shown. The camera is preferably a scouting camera 2 or other camera suitable for use in the outdoors, configured to endure typical weather conditions for relatively extended periods of time. Suitable scouting cameras 2 are available from Non Typical, Inc. of DePere, Wis., and are sold under the Cuddeback® brand and preferably those incorporating the Instant Trigger™ technology, such as the EXCITE® or other camera models. Scouting camera 2 triggers or records when game animal motion is detected, recording images and/or video of such game animals in a memory device or other suitable image or data storage medium.

Within the camera 2, a circuit board 3 is incorporated that communicates with and/or provides a mounting substrate for a solenoid system 5, as well as other components of the camera, such as a processor, one or more light or other sensors, the previously mentioned memory, and/or other components based on the particular intended end-use configuration of the camera 2. Regardless of the particular configuration of camera 2, the solenoid system 5 allows relatively quick optical filter-moving response times and uses relatively less energy to operate, as compared to optical filter-moving mechanisms of typical scouting cameras. This is accomplished by configuring solenoid system 5 to, for example, reduce the amount of time that a solenoid must be energized during an extended use time period, here again as compared to typical scouting cameras.

Figure 2:
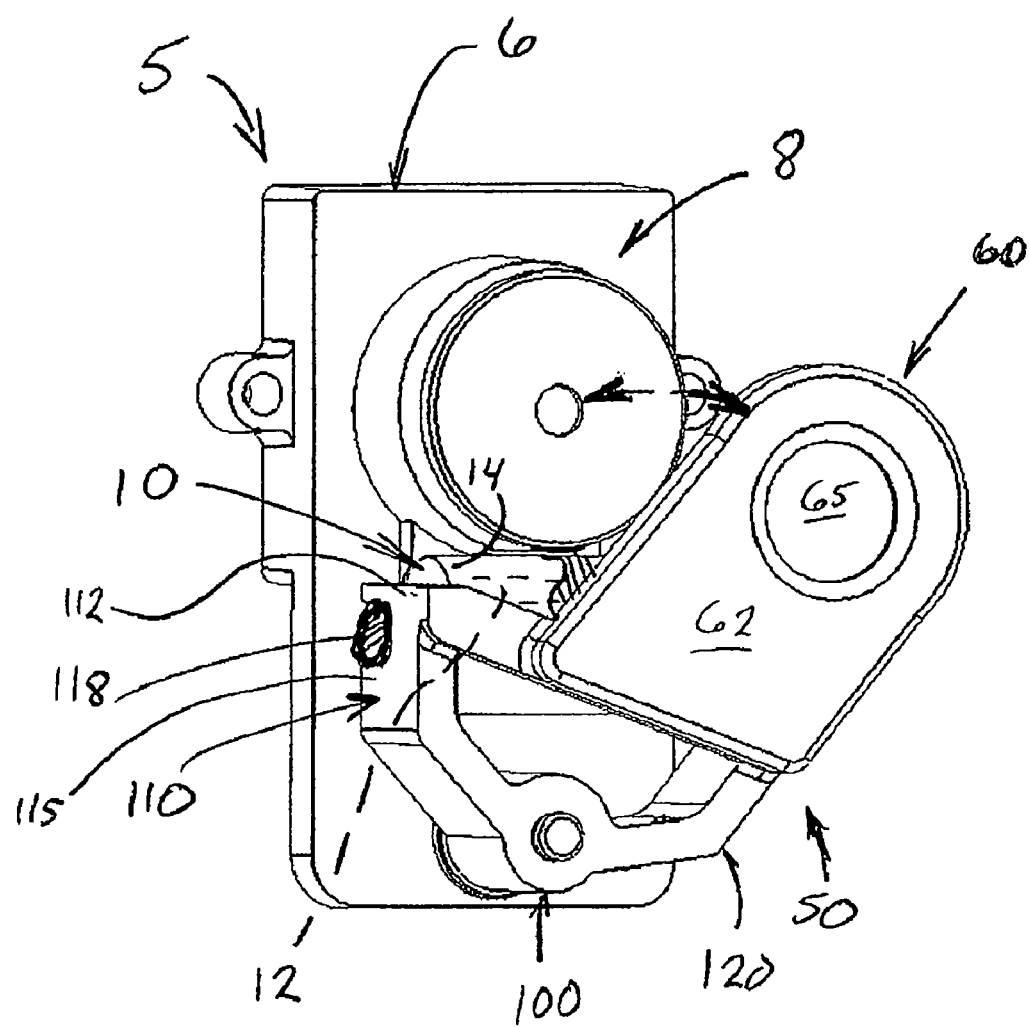
FIG. 2 is pictorial view of filter-moving solenoid system of FIG. 1 with a filter in an unfiltering position.
Figure 3:
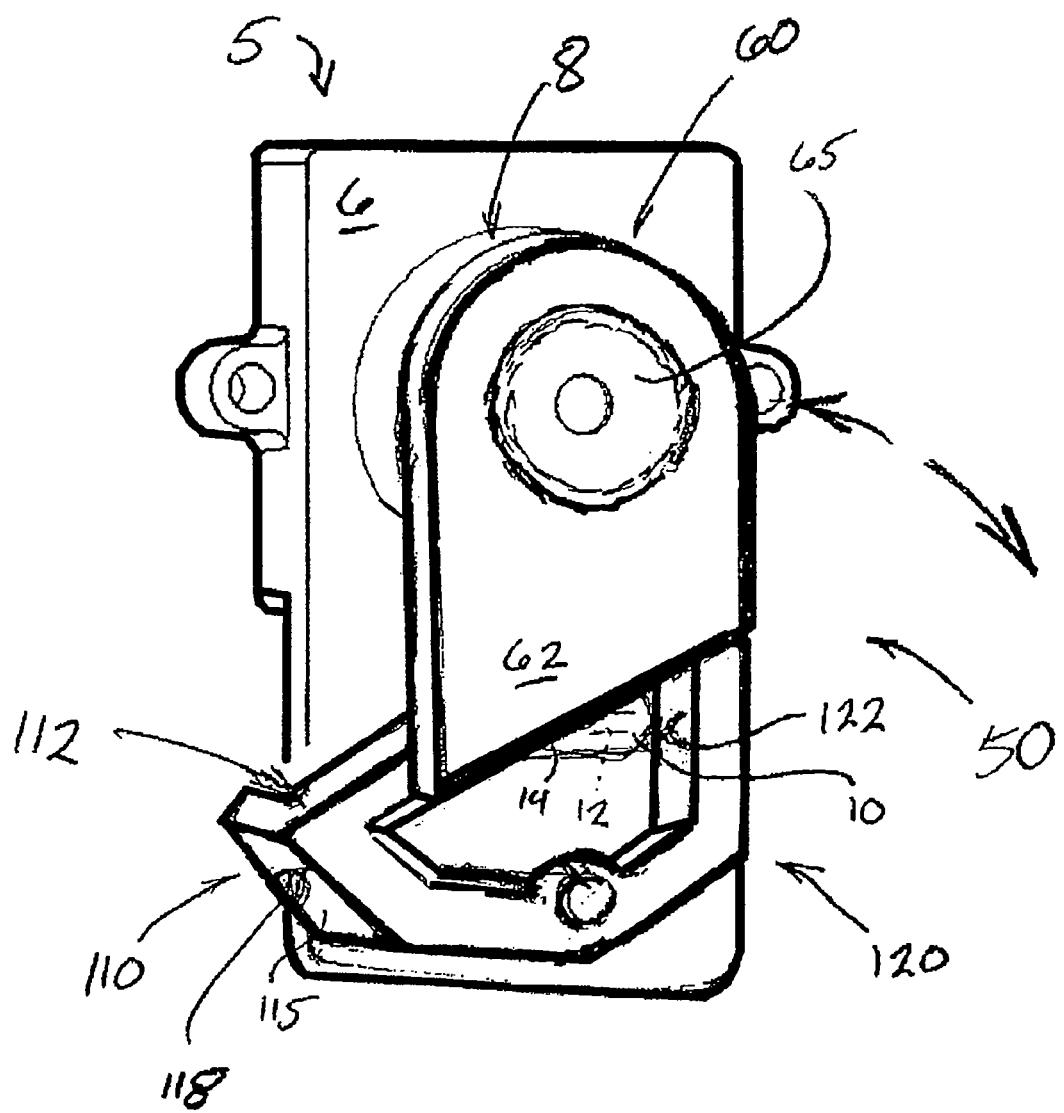
FIG. 3 is a pictorial view of the filter-moving solenoid system of FIG. 2 with the filter in a filtering position.

Referring now to FIGS. 2 and 3, solenoid system 5 includes a base 6 that can be a circuit board which is operably coupled to other camera components, or another mounting substrate for the remainder of the solenoid system 5. Base 6 can support other components of solenoid system 5, including lens 8, solenoid 10, and armature assembly 50.

Still referring to FIGS. 2 and 3, solenoid 10 is preferably an iron-cored solenoid but also includes other configurations depending on the particular desired end use characteristics. Solenoid 10 can include a cylindrical core 12 that is made of a ferromagnetic material which is circumferentially encapsulated by a concentric wire wrapping 14. Together the core 12 and wire wrapping 14 function as an electromagnet and cooperate with the armature assembly 50, for selectively moving the armature assembly 50 between an unfiltered position (FIG. 2) and a filtered position (FIG. 3).

Armature assembly 50 includes a filter assembly 60 that is mounted to and travels in unison with an armature 100, for example pivoting about a pin that pivotally attaches the armature 100 to the base 6. When the armature assembly 50 is in the unfiltered position, the filter assembly 60 is, for example, transversely spaced from an axis that extends perpendicularly from the lens 8. When the armature assembly 50 is in the filtering position, the filter assembly 60 is aligned or registered with and therefore covers the lens 8.

Still referring to FIGS. 1 and 2, filter assembly 60 can include a generally planar filter plate 62 that houses a filter material 65. The particular composition of filter material 65 is selected to impart a desired filtering functionality to the filter assembly 60. In preferred embodiments, the filter material 65 is configured to filter out or block infrared illumination, whereby the filter assembly 60 serves as an infrared filter, allowing a single camera in which it is implemented to capture images or video during both the daytime and the nighttime.

Armature 100 holds the filter assembly 60 and can have a forked configuration defined by first and second prongs 110 and 120 that are attached to each other at a common point, and extend from that common point, angularly away from each other. The first and second prongs 110 and 120 can lie on opposing sides of the solenoid 10.

Referring now to FIGS. 2-5, prongs 110 and 120 can include first and second contact segments 112 and 122, respectively. When the armature assembly 50 is in an unfiltering position (FIG. 1), the first contact segment 112 touches or lies adjacent to a first end of solenoid 10. When the armature assembly 50 is in a filtering position (FIG. 2), the second contact segment 122 touches or lies adjacent to a second end of solenoid 10.

Figure 4:
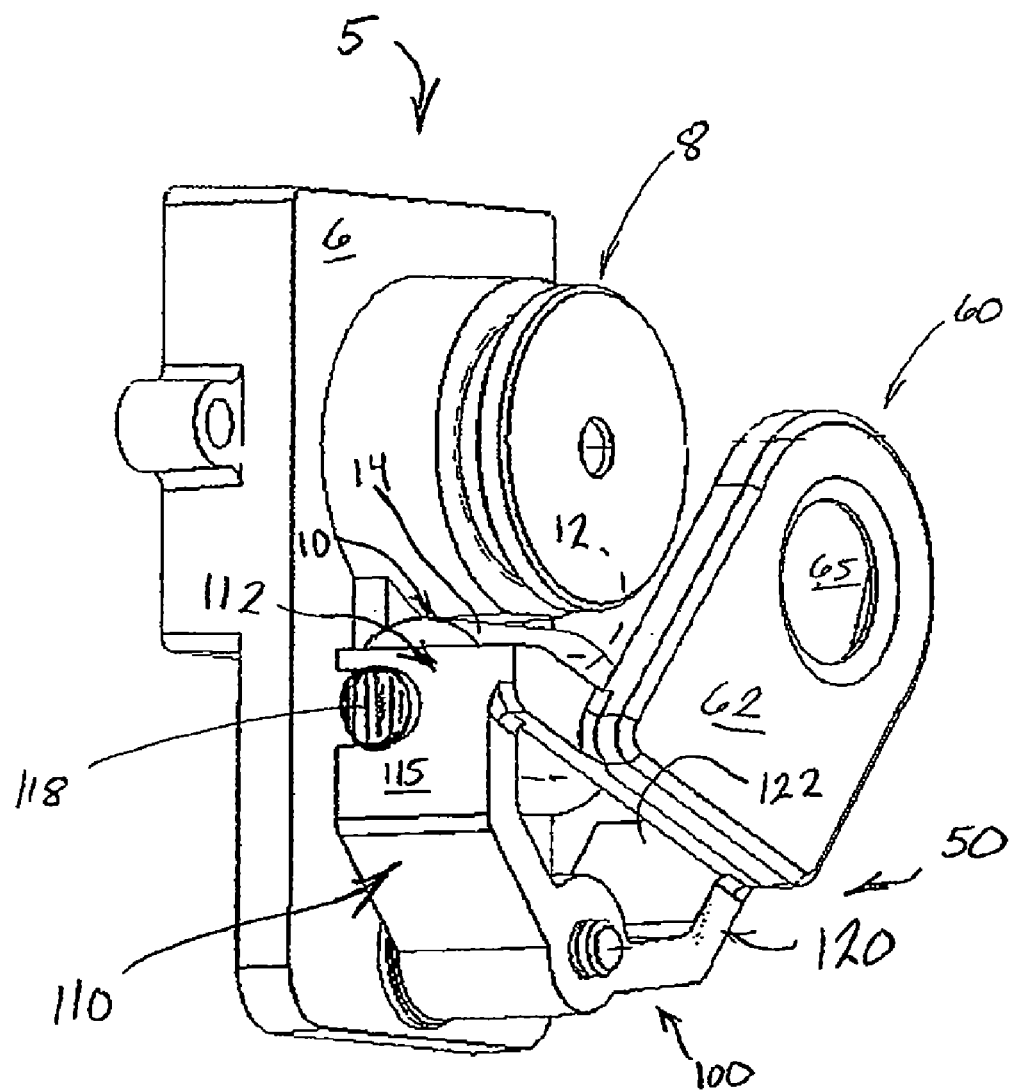
FIG. 4 is a close-up pictorial view of the filter-moving solenoid system of FIG. 2, showing a first side of the system.
Figure 5:
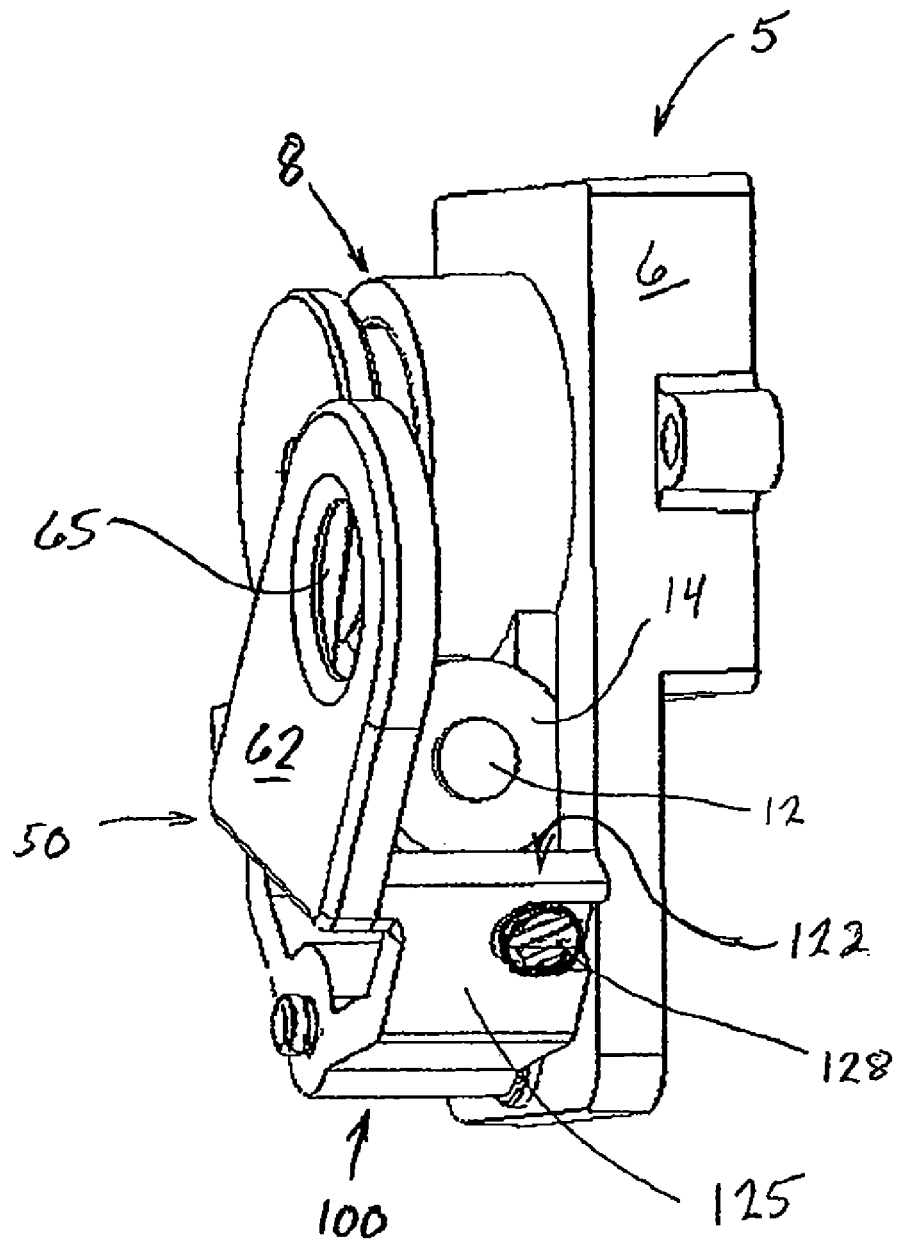
FIG. 5 is a close-up pictorial view of the filter-moving solenoid system of FIG. 2, showing a second side of the system.

Referring now to FIGS. 4 and 5, the contact segments 112 and 122 define outer surfaces of their respective sidewalls, e.g., outer surfaces 115 and 125. Each of contact segments 112 and 122 can include a permanent or other magnet, e.g., magnet 118 or 128, which is preferably recessed or inserted at least partially into the outer surface 115, 125 of the particular contact segment 112, 122.

Referring again to FIGS. 2-5, by way of magnets 118 and 128 or otherwise, the contact segments 112 and 122 cooperate with the solenoid 10 to allow the armature to sit in each of the filtering and unfiltering positions in a self-stable manner that does not require the solenoid to be energized.

Still referring to FIGS. 2-5, in light of the above, during use, the solenoid system 5 moves the filter assembly 60 over the lens 8 or removes the filter assembly 60 from the lens 8, leaving it unfiltered, based on the particular ambient light conditions at that particular point in time. In other words, when it is daytime with sufficient ambient light to illuminate the game animals being scouted, infrared illumination is filtered and prevented from entering the lens 8 by ensuring that the filter assembly 60 is in the filtering position (FIG. 2). When it is nighttime with insufficient ambient light to suitably illuminate the game animals being scouted, the filter assembly 60 is moved to the unfiltering position (FIG. 1), whereby the camera assumes an infrared mode. In this mode, an infrared flash is typically provided to illuminate the subject.

Referring now again to FIGS. 2 and 3, when the filter assembly 60 is in the unfiltered position (FIG. 2), it remains in that position in a self-stable or non-energy requiring manner. For example, the contact segment 112 is and remains pinned against the end of solenoid 10 due to the magnetic affinity that the magnet 118 has for the iron or other ferromagnetic material based core 12 and/or windings 14 of the solenoid 10. Stated another way, the armature 100 is magnetically stuck in this position.

To move the filter assembly 60 from the unfiltered (FIG. 2) or nighttime to the filtered (FIG. 3) or daytime position, the solenoid 10 is energized and correspondingly produces an electromagnetic field that is arranged to negate or oppose the magnetic attraction between magnet 118 and a first end of core 12, while attracting or drawing the magnet 128 toward the other end of core 12 and solenoid 10. Preferably, the magnets 118 and 128 and the solenoid 10 are configured and arranged to cooperate with each other to ensure quick actuation between the filtering and unfiltering positions of the armature assembly 50.

Referring again to FIGS. 2-5, quick actuation between the filtering and unfiltering positions of the armature assembly 50 can be suitably accomplished in the following manner. To move the armature assembly 50 from the unfiltering (FIG. 2) to the filtering (FIG. 3) position, solenoid 10 is energized by directing a current through coil 14 with a flow direction that induces an electromagnetic field with a polarity that opposes the nearest pole of magnet 118 and attracts the nearest pole of magnet 128.

Stated another way, when the solenoid 10 is energized, its end that is nearer magnet 118 has the same polarity or sign as the nearest pole of that magnet 118. The other end of solenoid 10 has the opposite polarity or sign as the nearest pole of the other magnet 128. Control is provided by a sensor 130, such as an ambient light sensor of conventional construction. If the sensor detects a threshold amount of light, the sensor will transmit a signal that causes an appropriate current to flow through coil 14.

For example, the processor of the camera 2 can be programmed to periodically determine a level of light by evaluating a signal from sensor 130, and determining if the filter assembly 60 is in an appropriate position or mode and, if not, move the filter assembly 60 to the appropriate position or mode. Therefore, if the filter assembly 60 is in the filtering or daytime position and the processor receives a signal from sensor 130 that meets or exceeds a threshold level, indicating that the ambient light conditions are dark enough to require nighttime mode, then the processor commands or signals the armature assembly 50 to move to the filter assembly 60 to the unfiltered or nighttime mode. The corollary of switching between nighttime mode and daytime mode occurs in the same way. That is, when the sensor 130 produces a signal that meets or exceeds a threshold level which indicates that ambient light conditions are sufficiently bright to require day mode, the processor commands or signals the armature assembly 50 to move the filter assembly 60 in front of the lens 8, thereby placing the camera in daytime mode by filtering out the infrared light.

Still referring to FIGS. 2-5, intuitively, to move the armature assembly 50 from the filtering (FIG. 3) to the unfiltering (FIG. 2) position, solenoid 10 is energized by directing a current through coil 14 with the opposite flow direction as that described above. Doing so reverses the polarity of the solenoid 10 and thereby induces an electromagnetic field with a polarity that opposes the nearest pole of magnet 128 and attracts the nearest pole of magnet 118. In this configuration, the armature assembly 50 can be quickly and energy efficiently "flip-flopped" back and forth between the filtering and unfiltering positions by momentarily energizing the solenoid 10 to induce a polarity across the solenoid with the characteristics required to produce the desired result of moving the armature assembly 50 in a particular manner. In this regard, the armature moves only while the solenoid is energized and continuously remains fixed in position with the solenoid is de-energized, with the magnetic coupling of the armature to the solenoid holding the armature in such fixed position.

Regardless, it is noted that many changes and modifications may be made to the present invention without departing from the spirit thereof. The scope of some of these changes is discussed above. The scope of others will become apparent from the appended claims.

I claim:

1. A solenoid system for moving a filter in a camera, comprising:
a solenoid;
an armature in moving communication with the solenoid, the armature having first and second operative positions;
a first contact segment engaging the solenoid when the armature is in the first operative position;
a second contact segment engaging the solenoid when the armature is in the second operative position; and
a filter mounted to and moving in unison with the armature, wherein energizing the solenoid moves the armature between the first and second operative positions, the solenoid being de-energized when the armature is in each of the first and second operative positions and wherein the armature is self-stable in each of the first and second operative positions such that one of the first and second contact segments of the armature biases toward and abuts the solenoid while the solenoid is de-energized.

2. The solenoid system of claim 1 wherein at least one of the first and second contact segments of the armature includes a permanent magnet that magnetically holds the at least one of the first and second contact segments against the solenoid when the solenoid is de-energized.

3. The solenoid system of claim 2 wherein the permanent magnet attracts to a ferromagnetic core of the solenoid, holding the armature in a fixed position in a self-stable manner.

4. A solenoid system for moving a filter in a camera, comprising:
   a solenoid having a cylindrical core with first and second ends;
   a forked armature having first and second contact segments positioned on opposing sides of the solenoid, the first and second contact segments movable along an arcuate travel path;
   a filter mounted to and moving in unison with the forked armature,
   wherein the first and second ends of the solenoid lie on the arcuate travel path of the first and second contacts such that the first contact segment is alignable with the first end of the solenoid and the second contact segment is alignable with the second end of the solenoid.

5. The solenoid system of claim 4 wherein (i) a first self-stable position of the armature is defined when the first contact segment is aligned with the first end of the solenoid, and (ii) a second self-stable position of the armature is defined when the second contact segment is aligned with the second end of the solenoid, wherein the first and second self-stable positions of the armature require no electromagnetic influence from the solenoid in an energized state to maintain such first and second self-stable positions.

6. The solenoid system of claim 5 wherein energizing the solenoid is used to provide a driving force for moving the armature but is not used to maintain the armature in a non-moving position.

7. The solenoid system of claim 6 wherein the first and second contact segments of the forked armature include permanent magnets.

8. The solenoid system of claim 7 further comprising first and second prongs that are connected to each other, at least partially defining the forked armature.

9. The solenoid system of claim 8 wherein the permanent magnets are attached to the first and second prongs.

10. The solenoid system of claim 9 wherein the permanent magnets are recessed into outwardly facing surfaces of the first and second prongs.

11. The solenoid system of claim 4 wherein the forked armature pivots about an axis that is transversely displaced from a medial portion of the solenoid.

12. A scouting camera comprising:
    a lens through which photographs or video is taken by the scouting camera;
    a filter that selectively overlies the lens;
    a solenoid facilitating movement of the filter and including at least some ferromagnetic material therein;
    an armature that is attached to and moves the filter, the armature including at least two magnets that selectively and magnetically couple to the solenoid such that when each of the magnets is magnetically coupled to the solenoid, the armature does at least one of (i) holding the filter over the lens, and (ii) holding the filter away from the lens when the solenoid is de-energized.

13. The scouting camera of claim 12 in which the armature further includes first and second prongs to which the magnets are mounted, the first and second prongs having portions thereof that are spaced from each other.

14. The scouting camera of claim 13 in which the solenoid system further includes a base from with the lens extends, the base being mounted to a circuit board that is provided within the scouting camera.

15. The scouting camera of claim 14 in which the armature further includes a pin that pivotally attaches the armature to the base of the solenoid system.

16. The scouting camera of claim 12 wherein the armature moves only while the solenoid is energized and continuously remains fixed in position with the solenoid is de-energized.

* * * * *